United States Patent
Arnold et al.

[15] 3,658,649
[45] Apr. 25, 1972

[54] CEPHALOSPORIN DERIVATIVES
[72] Inventors: Benjamin Harry Arnold, Slough; Robert Anthony Fildes, Chesham; David Arthur Gilbert, Slough, all of England
[73] Assignee: Glaxo Laboratories Limited, Greenford, England
[22] Filed: Aug. 1, 1969
[21] Appl. No.: 846,963

[30] Foreign Application Priority Data
Aug. 2, 1968 Great Britain......................37,113/68

[52] U.S. Cl....................................195/29, 195/30, 260/243
[51] Int. Cl. .........................................................C12d 9/00
[58] Field of Search.....................195/29, 36, 36 P; 260/243; 424/117

[56] References Cited

OTHER PUBLICATIONS

Bailey et al. " Diagnostic Microbiology" 2nd Ed., 1966, p. 220

Foster, " Chem. Activities of Fungi," 1949, p. 507
Chemical Abstracts 59:11907c, 1963
Bender et al. " Biochem. J." 46:210, 1950, pp. 210– 219

Primary Examiner—A Louis Monacell
Assistant Examiner—Max D. Hensley
Attorney—Bacon & Thomas

[57] ABSTRACT

A process is disclosed for the preparation of a 7$\beta$-(4-carboxybutanamide) ceph-3-3em-4-carboxylic acid or a 7$\beta$-(5-carboxy-5-oxopentamido) ceph-3-em-4-carboxylic acid by subjecting a 7$\beta$-(D-5-amino-5-carboxypentamido) ceph-2-em-4-carboxylic acid to the action of a cell-free fungal D-amino acid oxidase. The modified cephalosporin compounds produced exhibit antimicrobial activity and are useful as presursors in the synthesis of 7-aminocephalosporanic acid and 7$\beta$-acylamido analogues of cephalosporin C.

13 Claims, No Drawings

CEPHALOSPORIN DERIVATIVES

This invention is concerned with an enzymic oxidation process for the production of new and useful substances from the antibiotic cephalosporin C.

The cephalosporin compounds referred to in this specification are generally named with reference to cepham. Cepham has the structure

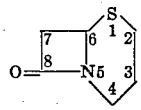

(see J.A.C.S. 1962, 84, 3400 and J. Chem. Soc. 1965, 5031). The term "cephem" refers to the basic cepham structure with a single double bond.

Cephalosporin C [3-acetoxymethyl-7β-(D-5-amino-5-carboxypentanamido) ceph-3-em-4-carboxylic acid] may be converted to 3-acetoxymethyl-7β-aminoceph-3-em-4-carboxylic acid (7-aminocephalosporamic acid or, briefly, 7-ACA) and thence to 7β-acylamido analogues of cephalosporin C having modified antibacterial activity. However, N-deacylation of cephalosporin C is inherently difficult due, it is believed, to the structure of the D-5-amino -5-carboxypentanoyl side chain. Although 7-ACA can be prepared from cephalosporin C in fair yield by means of nitrosyl chloride, there is a need for alternative methods offering advantages.

It has now been found that the side chain on the 7β-amino group in cephalosporin C can be oxidized enzymically to provide certain intermediates, which may then readily be N-deacylated to 7-ACA. The process may also be applied to derivatives of cephalosporin C wherein the acetate group in the side chain at the 3-position has been replaced by the residue of a nucleophile or a hydroxy group or a hydrogen atom.

According to the invention, therefore, there is provided a process for the preparation of cephalosporin compounds having a modified 7β-D-5-amino-5-carboxypentanamido) side chain which comprises subjecting a compound of formula II:

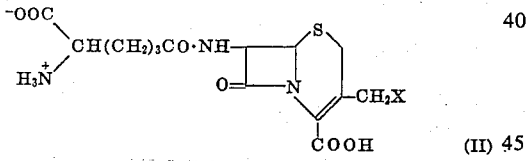

or a salt thereof, where X is an acetate group, the residue of a nucleophile, a hydroxy group or a hydrogen atom, to the action of a fungal D-amino acid oxidase.

Depending on the circumstances under which the enzymic oxidation is effected one will normally obtain a compound of the formula:

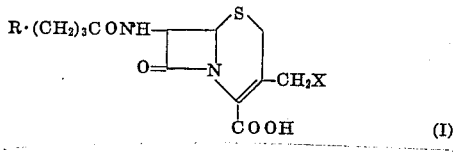

or a salt thereof, where R is the group —CO.COOH, or —COOH and X has the above defined meaning.

Compounds of formula (I) are novel and thus form part of the invention. Although they have antibacterial activity, their main utility is as intermediates as explained below.

The fungal D-amino acid oxidase may, for example, be derived from *Aspergillus* species, e.g. *A. flavus, A. parasiticus, A. flavus-oryzae* or *A. ustus;* or from *Penicillium* species, e.g. *P. chrysogenum* or *P. roqueforti;* or from *Neurospora* or *Aerobacter* species. Alternatively the D-amino acid oxidase may be derived from a yeast which is of course a monocellular fungus. Thus, a most convenient source of fungal D-amino acid oxidase is the yeast *Trigonopsis variabilis*. Preferred oxidases are those derived from *Trigonopsis variablis* and *A. flavus-oryzae*. Suitable strains of organisms may be obtained from well known culture collections. For example *A. ustus* IMI116045, *A. flavus* IMI52104, and *A. parasiticus* IMI 15957 and from the Commonwealth Mycological Institute, Kew, Richmond, Surrey, England and *Trigonopsis variabilis* CBS 4095 from the Centraal Bureau voor Schmmelcultur, Baarn, Holland.

Although it is not necessary to induce the formation of D-amino acid oxidase in the fungal cells, we have found it preferable to do so. Induction may be achieved by the addition of the D-form (or DL-racemate) of a common amino acid to the fermentation at the seed stage. The type and quantity of amino acid to effect induction of the D-amino acid oxidase in specific fungal cells can be determined by preliminary trial and experiment. We have been able to effect induction in *A. flavus* and *A. parasiticus* by means of DL-valine and DL-alanine, the latter being particularly effective at 0.20 percent (w/v) concentration. Again, methionine has been found to effectively induce oxidase formation by *Trigonopsis variabilis*.

The D-amino acid oxidase must be released from the cells prior to use as the whole cells are generally inactive. This may be effected either by forming a "powder" or by forming cell free extracts.

In the preparation of "powders," the cells are filtered off from the culture medium and a wet cell suspension prepared. This can be stored if desired. The suspension may be treated with a suitable solvent e.g. acetone, to effect lysis of the cell walls, followed by filtration of the solids, washing of the solids and drying. The formation of "powders" in this way is normally effected with acetone but the latter is not essential provided the solvent used effects lysis of the cell wall and does not denature the enzyme. Further purification of acetone powders may be achieved by grinding.

In the preparation of cell free extracts, the wet cell suspension is first treated to effect lysis of the cell walls e.g. by treatment with a solvent such as acetone, by alternative freezing and thawing, by autolysis, by papain digestion, by ultrasonic disruption or by homogenization. Cell debris is then recovered from the resulting material, e.g. by centrifugation, leaving a residual extract containing D-amino acid oxidase and catalase. Further concentration and purification of the extract may be effected by, for example, gellfiltration, for example in the case of *Aspergillus* extracts, or fractionation with ammonium sulphate which has been found most satisfactory for recovery of D-amino acid oxidase from Trigonopsis extracts.

D-Amino acid oxidase activity may be estimated most satisfactorily by determining the rate of formation of hydrogen peroxide spectrophotometrically using the hydrogen donor o-dianisidine as indicator. In the presence of peroxidase, o-dianisidine is oxidized by the hydrogen peroxide to form a brown dye.

Compounds of formula (I) wherein R is the group —CO.COOH are prepared by reacting the appropriate compound of formula (II) with D-amino acid oxidase in the presence of catalase. The latter enzyme is normally present in the D-amino acid oxidase preparation, but extra catalase may be added if required. The amount of additional catalase required may readily be determined by preliminary trial and experiment. The function of the catalase is to prevent oxidative decarboxylation resulting in the formation of compounds of formula (I) in which R is the group —COOH instead of the desired compounds (R is the group —CO.COOH); the compounds of formula (I) in which R is the group —CHO are intermediates in this oxidative decarboxylation.

Compounds of formula (I) wherein R is the group —COOH are prepared by reacting the appropriate compound of formula (II) with D-amino acid oxidase either in the absence of catalase or by inhibiting any catalase present in the D-amino acid oxidase. It is not normally necessary to purify the D-amino acid oxidase to remove all traces of catalase since the activity of the latter can be inhibited where necessary. Suitable catalase inhibitors are ascorbic acid, 3-amino-1,2,3-triazole and inorganic azides. Sodium azide is particularly preferred. The level of sodium azide may be as low as 1 mM when using D-amino acid oxidase extracts but when using acetone powders up to 100 mM or even more may be desirable.

The reaction of the enzyme system with the compound of formula (II) may be effected at a pH of from 6 to 9 and preferably about 8. Temperatures between ambient and about 50° may be used, the optimum temperature being about 33° C. However, both with regard to pH and temperature, conditions must not be selected which result in deactivation of the enzyme. An enzyme level of not less than 20 units/mg. (as defined below) of the cephalosporin starting material should be utilized. At this level, a reaction time of at least 3 hours may be necessary. With higher enzyme levels, e.g. 40 or 60 units/mg., shorter reaction times, e.g. 2 hours, are possible. The rate of oxidation of compounds of formula (II) is directly proportional to the concentration of the compounds of formula (II) in the enzymic oxidation system. Stirring, together with aeration, either with air or oxygen, is desirable. An aeration rate of 1 volume of gas/volume of system/minute gives good results.

The compounds of formula (I) in which R is a —CO.COOH group are not very stable and the reaction conditions, and especially the reaction times (which should be short e.g. 1–2 hours), need to be carefully chosen.

Cephalosporin C is difficult to extract from fermentation broths due to its amphoteric structure and hydrophilic nature. The process of the present invention may be effected in situ (before or after removal of the mycelium) in a cephalosporin C fermentation broth under appropriate conditions and the resulting compounds of formula (I) (X = acetoxy) recovered. The process is preferably effected after the protein has been filtered off. Thereafter the resulting compounds of formula I may be recovered by solvent extraction or by absorption on a column of ion exchanger.

Conversion of cephalosporin C to 3-acetoxymethyl-7β-(4-carboxybutanamido)ceph-ceph-3-em-4-carboxylic acid in deproteinized cephalosporin fermentation broth requires a considerable excess of enzyme over that needed when starting from cephalosporin C which has already been isolated, because of the presence of oxidase inhibitors in the broth.

The compounds of formula (I) where X is an acetate group may be conveniently extracted from the aqueous solution in which they have been prepared, for example by acidification to a pH of 1.5 or less and extraction with an appropriate organic solvent, e.g. ethyl acetate of n-butanol. Multiple extractions with ethyl acetate will give substantially complete extraction, but the efficiency can be improved by making the aqueous phase saturated, or substantially saturated, with a soluble inert inorganic salt e.g. sodium chloride. This method is not, however, very successful in extracting the compounds from fermentation broths.

In isolating the products from both fermentation broths and simple aqueous solutions, a system using a combination of an ion-exchanger and solvent extraction has been found to give good results. Suitable ion-exchangers are the high molecular weight liquid amine anion exchangers sold by Rohm and Haas Co. under the names Amberlite LA1, LA2, and LA3. (LA1 and LA2 are secondary amines; LA3 is a primary amine). Preferred solvents for use in conjunction with the liquid anion-exchangers are n-butanol and butyl acetate.

A system which has been used with particular advantage in extractions from deproteinized cephalosporin fermentation broths is Amberlite LA1 in n-butanol, followed by back extraction with sodium bicarbonate solution and extraction into ethyl acetate. The pH of the broth is preferably reduced below 6 and most advantageously to 3–5 before extraction.

The solid anion-exchange resin, Amberlite XAD2, which is a macroreticular, cross-linked polystyrene polymer, may also be used in extracting compounds of formula (I) where X is an acetate group from crude or deproteinized cephalosporin fermentation broths. A suitable solvent for eluting the adsorbed compound from the resin may be determined by preliminary experiment. In the case of 3-acetoxymethyl-7β-(4-carboxybutanamido)ceph-3-em-4-carboxylic acid a suitable solvent is acetone.

The compounds of formula (I) where X is the residue of a nucleophile or a hydroxy group or a hydrogen atom may be recovered from the aqueous media in which they have been prepared in a similar manner to that described above. This will depend on the nature of the X group and variations in the extraction conditions may be necessary. These can readily be determined by preliminary trial and error experiments.

Compounds of formula (I) in which R is —COOH may be converted directly into the corresponding 7β-amino compounds using the method described in Belgian Pat. No. 719,712 by reaction with an imide halide forming component, converting the imide halide so obtained into an imino ether and decomposing the imino ether. Compounds of formula (I) in which R is —CO.COOH are preferably reduced, for example using an alkali metal borohydride, to the corresponding compounds in which R is —CH(OH)COOH, before the modified side chain is removed by the method described in Belgian Pat. No. 719,712.

In consequence, important compounds of formula (I) are those in which (A) R is —CO.COOH and X is an acetate group, namely 3-acetoxymethyl-7β-(5-carboxy-5-oxopentanamido)ceph-3-em-4-carboxylic acid and (B) R is —COOH and X is an acetate group, namely 3-acetoxymethyl-7β-(4-carboxy-butanamido) ceph-3-em-4-carboxylic acid. These compounds are key intermediates in the production of 7-ACA from the naturally occurring cephalosporin C. Compound (B) (R = —COOH) is especially important in this respect.

The starting compounds of the process according to invention wherein X is the residue of a nucleophile may be prepared by reacting cephalosporin C with a nucleophile, for example, pyridine or other tertiary amine as described in British Pat. No. 912,541; a sulphur-linking, nitrogen-linking or inorganic nucleophile as described in British Pat. No. 1,012,943; a sulphur-linking nucleophile as described in British Pat. No. 1,059,562; a nitrogen-linking nucleophile as described in British Pat. Nos. 1,030,630, 1,082,943 and 1,082,962; a sulphur-linking nucleophile as described in British Pat. No. 1,101,423. This list is not limiting and is given purely by way of illustration. Where X is a hydroxy group the compound may be prepared by the methods described in British Pat. No. 1,121,308; where X is a hydrogen atom the compound may be prepared by the method described in British Pat. No. 957,569.

For the better understanding of the invention the following Examples are given by way of illustration only:

PRELIMINARY

*Aspergillus flavus-oryzae* and *Trigonopsis variabilis*

In the preliminary experiments both cultures were grown in 250 ml. shake flasks containing 50 ml. of medium. The *Aspergillus* was grown in nutrient medium (2 percent cornsteep liquor and 2 percent glucose in water adjusted to pH 5.0) containing 0.2 percent alanine at 27° and harvested at 48 hr. The *Trigonopsis* was grown in the medium containing methionine described by Sentheshanmuganathan and Nickerson (1962), J. Gen. Microbiol. 27,465, at 27° and harvested at 72 hr.

Preparation of cells

Wet cell suspensions. The cells were filtered off on No. 1 Whatman filter paper; washed twice with distilled water and stored at −10°. A suitable quantity was thawed when required and suspended in 0.01 M buffer at pH 8.1 (sodium pyrophosphate or ethanolamine).

Preparation of acetone powder

Acetone powder. The suspension of cells was added with stirring to 10 volumes of acetone (w/v). The suspension was thoroughly mixed then filtered through No. 1 Whatman paper and dried with a little ether.

Preparation of cell free extracts

Ultrasonic disintegration. The suspension of wet cells was sonicated at 4° at 20 Kc/sec in an M.S.E. (Model 60W) Ultrasonic Disintegrator.

Homogenization. The suspension of wet cells was chilled to about 15° then passed through the A.P.V. Manton Gaulin Laboratory and Submicron Disperser (type 15M-8BA SMD).

After each passage through the machine the homogenate was chilled in an ice bath.

The extracts obtained by these methods were centrifuged at 38,000 g. for 15 minutes to remove the cell debris.

Purification of amino acid oxidase (AAO)

Purification of amino acid oxidase from Aspergillus by gel filtration

An extract from Aspergillus was freeze dried, resuspended in 0.001 M sodium pyrophosphate buffer pH 8.1 (one-tenth of the original volume) and cleared by centrifuging at 38,000 g. for 15 minutes.

10 ml. of concentrated extract was put on a column (100 cm × 2.5 cm) of Bio-Gel P.2 or P.100 and developed at a rate of 50 ml./hr. with 0.002 M sodium pyrophosphate buffer pH 8.1. The eluate, which was monitored with an LKB Uvicord at 260 nm, was collected in 10 ml. fractions.

Purification of amino acid oxidase from Trigonopsis by $(NH_4)_2SOB4$ fractionation 400 ml. of extract from *Trigonopsis* was made 30 percent saturated with $(NH_4)_2SO_4$ at 4°. The solution was thoroughly mixed, taking care to avoid foaming, then left to stand for a further 30 minutes. The suspension was centrifuged at 23,000 g. for 30 minutes at 4°. The supernatant was made 50 percent saturated with $(NH_4)_2SO_4$, stirred for 5 minutes and left to stand for a further 30 minutes. The precipitate was collected by centrifugation at 38,000 g. for 30 minutes and resuspended in 0.1 M sodium pyrophosphate buffer.

Estimation of D-amino acid oxidase activity

Amino acid oxidase (AAO) activity was determined spectro-photometrically by following the rate of formation of hydrogen peroxide ($H_2O_2$).

The method is based on the coupled reactions shown in equations 1 and 2.

(1) Amino acid + $H_2O$ + $O_2$ [AAO] α-Keto acid + $NH_3$ + $H_2O_2$ (2) $H_2O_2$ + $DH_2$ [POD] $2H_2O$ + D Hydrogen peroxide in the presence of peroxidase (POD) oxidizes the hydrogen donor o-dianisidine ($DH_2$) to a brown dye (D).

The assay was carried out at 37° in a glass cuvette with a 1 cm light path and the formation of the brown dye was followed at 420 nm. The reaction mixture consisted of 1.0 ml. 0.1 M sodium pyrophosphate buffer pH 8.1, 0.5 ml. o-dianisidine solution (0.04 percent o-dianisidine HCl in water), 0.3 ml. substrate (1 percent sodium cephalosporin or 2 percent D-alanine in sodium pyrophosphate buffer pH 8.1), 0.01 ml. peroxidase (10 mg/ml. aqueous solution) and sufficient water to make the final volume 2.8 ml.

The reaction was started by the addition of 0.2 ml. enzyme solution to the reaction mixture. The blank contained 2.8 ml. water and 0.2 ml. of enzyme.

The linear increase in optical density at 420 nm during the first 5 minutes was used to measure the AAO activity.

A unit of enzyme activity is defined as the quantity of enzyme which, at 37° and pH 8.1, produces a change in optical density of 0.001/min.

Horizontal paper electrophoresis

Samples (10μl) were put on strips of Whatman 3MM chromatography paper (2 cm × 35 cm) and electrophoresed towards the anode for 2 hours at 500 volts in 0.01 M phosphate buffer pH 7.0. The paper was dried at ambient temperature. The compounds were located by examining the paper under ultraviolet light. The zones at absorption were cut out and soaked in 5 percent sodium bicarbonate (5 ml.) for up to 60 minutes. The absorption of the solution was read at 257 nm and used to calculate the quantity of cephalosporin compound present.

Thin Layer Chromatography (TLC)

Samples (5μl were put on a TLC plate of cellulose and developed with 70 percent propanol. The compounds were located by examining the plate under ultra-violet light.

Amberlites LA1, LA2. and LA3

15 percent v/v solutions of the liquid amines in n-butanol were prepared and saturated with water. The solvent was regenerated by shaking 3 times with 4N sodium hydroxide saturated with n-butanol and washing with water saturated with n-butanol until the washings were neutral. Amberlite LA1. can also be recovered by distillation under reduced pressure, b.p. 210°/10 mm.

Amberlite XAD2

20 g. and 100 g. columns of Amberlite XAD2. were prepared by suspending the resin in acetone, allowing to stand for 15–30 mins., then washing with 20 bed volumes of water. The columns were regenerated by stripping with 2N hydrochloric acid in acetone and washing with at least 20 bed volumes of water.

Dinitrophenylhydrazine (D.N.P) Assay of Amino Acid Oxidase

The enzyme activity was measured by following the rate of formation of 3-acetoxymethyl-7β-(5-carboxy-5-oxopentanamido)ceph-3-em-4-carboxylic acid colorimetrically as its 2,4-dinitrophenylhydrazone derivative.

Acetone powder in 5 ml. of 0.1 M pyrophosphate buffer pH 8.1 containing 1,250 units catalase (Sigma units) and 0.05 mg flavein adenine dinucleotide was mixed and incubated at 33° C with 5 ml. of 6 percent cephalosporin C solution previously adjusted to pH 7.9 with 0.1 N sodium hydroxide. 1 ml. samples were taken at 0 minutes and after 15 minutes incubation, mixed thoroughly with 2 ml. of 0.35 percent 2,4-dinitrophenylhydrazine in 2N HCl, then extracted with 8 ml ethyl acetate. 6 ml. of the ethyl acetate layer was back-extracted into 5 ml. of 0.4 M sodium bicarbonate-sodium carbonate buffer and the yellow color of the 2,4-dinitrophenylhydrazone measured at 370 nm.

The quantity of dinitrophenylhydrazone formed was calculated from a calibration curve which had been constructed with purified 2,4-dinitrophenylhydrazone. 1 unit of enzyme is that which produces 1 micromole (μmole) 3-acetoxymethyl-7β-(5-carboxy-5-oxopentanamido)ceph-3-em-4-carboxylic acid per minute under the standard conditions used.

Examples 1, 2(a), 3, 4 and 15 relate to the preparation of 3-acetoxymethyl-7β-(5-carboxy-5-oxopentanamido)ceph-3-em-4-carboxylic acid; Example 5 relates to the extraction and purification of this compound; Examples 6–8 relate to the preparation of 3-acetoxymethyl-7β-(4-carboxybutanamido)ceph-3-em-4-carboxylic acid; Examples 9–11 relate to the extraction and purification of this latter compound; and Examples 12–14 relate to compounds in which X is other than an acetate group.

A Sigma unit of catalase is defined to be the amount of catalase which will decompose one micromole of hydrogen peroxide per minute at pH 7.0 and 25° C while the peroxide concentration falls from 10.3 to 9.2 micromoles per ml. of reactants.

EXAMPLE 1

Acetone powdered mycelium of *A. flavus-oryzae* (20 g.) was suspended in water (1 liter) and the pH adjusted to 7.9 with N-sodium hydroxide. Flavine adenine dinucleotide (FAD) (85 percent, 5 mg) and catalase suspension (0.20 ml. ≡ 160,000 Sigma units) were added followed by cephalosporin C ($E_{1cm}^{1\%}$ = 145; 76.5% pure; 10g.)

and the pH readjusted to 7.9. A sample was removed for assay and the remainder incubated in a water bath at 33° for 1.5 hours while a fast stream of air was blown through via a sinter bubbler. The final pH was 7.0. After incubation, the mycelium was removed by filtration, the residue washed with water and the washings combined with the filtrate. Final volume = 1050 ml. A further sample was removed for assay.

The reaction was assayed using the D.N.P. method. This showed a conversion of 48.5 percent.

The product was extracted from the filtrate as follows:

The filtrate was adjusted to pH 1.9 with concentrated phosphoric acid. The acidified filtrate was then extracted with ethyl acetate (2 liters). The extract was washed once with water (80 ml.) and the wash water returned to the spent aqueous fraction. The ethyl acetate was then filtered and back extracted with water (160 ml.) to which sufficient 0.5M sodium bicarbonate solution had been added to make the aqueous layer pH 5.5 (20 ml.). The ethyl acetate layer was further extracted with water (150 ml.) and sodium bicarbonate (1 ml.) and then discarded.

The original spent aqueous solution was adjusted to pH 1.6 with concentrated phosphoric acid (15 ml.) and extracted with ethyl acetate (2 liters). The ethyl acetate was washed with water (80 ml.), filtered, and back extracted with the first aqueous extract obtained above, adjusting the pH of the aqueous layer to 4.3 with 0.5M sodium bicarbonate. The ethyl acetate was finally extracted with the second aqueous extract to pH 5.5. then discarded. The total volume of 0.5M sodium bicarbonate used was 34.5 ml. Further extraction of the original aqueous reaction solution yielded little material. The combined aqueous sodium bicarbonate extracts were held under vacuum to remove ethyl acetate and then freeze dried. This yielded 3.53 g. of a solid preparation. The product was chromatographed on pH 6.0 buffered papers in 70 percent (v/v) aqueous propanol and showed only one spot, corresponding to 3-acetoxymethyl-7β-(5-carboxy-5-oxopentanamido)ceph-3-em-4-carboxylic acid, under ultra-violet light and on subsequent bioautography.

The purity of the solid was assayed by ultra-violet absorption and by means of the D.N.P. assay. It had $$E_{1\,cm.}^{1\%} = 172,$$

which corresponds to a purity of 86 percent assuming the pure compound to have $$E_{1\,cm.}^{1\%} = 200.$$

The D.N.P. assay gave a figure of 70 percent. This represents an absolute yield of 32 percent.

EXAMPLE 2 a. 3-Acetoxymethyl-7β-(5-carboxy-5-oxopentanamido)ceph-3-em-4-carboxylic acid

*A. flavus* mycelial acetone-powder (11 g.) was homogenized in water (350 ml.), the pH adjusted to 7.7, and a solution of the dipotassium salt of cephalosporin C (4 g.) in water (150 ml.) with pH adjusted to 7.7 was added. The mixture in contact with atmospheric oxygen was shaken at 37° C. for 4 hours, filtered, and the filtrate freeze-dried. This yielded solid 3-acetoxymethyl-7β-(5-carboxy-5-oxopentanamido)ceph-3-em-4-carboxylic acid (6.58 g.);

$$\lambda_{max.}\ 260\ nm.,\ E_{1\,cm.}^{1\%} = 79.$$

This solid was dissolved in water, the pH was adjusted to 1.5, and the solution was extracted with ethyl acetate (first with 1 × 200 ml. and then 9 × 200 ml.). The first extract on evaporation yielded a solid (500 mg.);

$$\lambda_{max.}\ 260\ nm.,\ E_{1\,cm.}^{1\%} = 158.$$

Electrometric titration of this solid indicated purity of about 88 percent. On chromatography in a propanol-water (7:3) system, the product moved with $R_{ceph.C}$ 1.54, and on electrophoresis at pH 4.5 in 0.05M pyridine acetate the product moved 12 cm. towards the anode, cephalosporin C moving 8 cm. in the same time. The bulked extracts 2–10 on evaporation yielded a solid (720 mg.);

$$\lambda_{max.}\ 260\ nm.,\ E_{1\,cm.}^{1\%} = 127.$$

Although this product was not as pure as the above solid, its chromatographic properties were identical.

b. Preparation of the 2,4-dinitrophenylhydrazone of 3-acetoxymethyl-7β-(5-carboxy-5-oxopentanamido)ceph-3-em-4-carboxylic acid 3-Acetoxymethyl-7β-(5-carboxy-5-oxopentanamido)ceph-3-em-4-carboxylic acid (284 mg.), $\lambda_{max.}$ 260 nm, $$E_{1\,cm.}^{1\%} = 127,$$

was dissolved in methanol (2 ml.) and water (2 ml.). To this solution was added excess of 2,4-dinitrophenyl-hydrazine (0.35 percent) in 2N-hydrochloric acid. The suspension formed after 1 hour was extracted with ethyl acetate (2 × 3 vols.) and the bulked ethyl acetate fractions were dried over sodium sulphate and evaporated to dryness in vacuo.

The yield of amorphous solid of the 2,4-dinitrophenyl-hydrazone was 200 mg. Its ultra-violet spectrum showed $\lambda_{max.}$ 260 nm, $\epsilon$ 16,500, and $\lambda_{max.}$ 370 nm, $\epsilon$ 21,750, the molecular weight being assumed to be the calculated 595.

The biological activity of this compound as measured by cup-plate assay against a penicillin sensitive strain of *Staphylococcus aureus* was three times that of cephalosporin C. Analysis: C, 44.4%; H, 3.94%; N, 14.49%; S, 4.60%. $C_{22}H_{22}ON_6S$ requires C, 44.5%; H, 3.86%; N, 14.1%; S, 5.38%.

EXAMPLE 3

*A. ustus* mycelial acetone powder (6.2 g.) in water (177 ml.) (pH 7.8) was mixed with a solution of the potassium salt of cephalosporin C (1.7 g.) in water (88.5 ml.). (pH 7.8), and reacted at 37° C, with shaking for 3.5 hours as in Example 2(a). After filtration, the supernatant liquid yielded a solid (2.79 g.); $\lambda_{max.}$ 260 nm, $$E_{1\,cm.}^{1\%} = 70,$$

on freeze-drying.

The solid was redissolved in water (50 ml.), the pH was adjusted to 1.5, and the solution was extracted with ethyl acetate (1 × 100 ml. and then 4 × 100 ml.). On evaporation to dryness the first extract yielded solid (339 mg.); $\lambda_{max.}$ 260 nm, $$E_{1\,cm.}^{1\%} = 156.5,$$

and the bulked extracts yielded solid (170 mg.); $\lambda_{max.}$ 260 nm $$E_{1\,cm.}^{1\%} = 139,$$

3-acetoxymethyl-7β-(5-carboxy-5-oxopentanamido)ceph-3-em-4-carboxylic acid. These solids had the chromatographic properties of the product described in Example 2(a).

EXAMPLE 4

3-Acetoxymethyl-7β-(5-carboxy-5-oxopentanamido)ceph-3-em-4-carboxylic acid from cephalosporin C fermentation broth Whole broth from the fermentation of *Cephalosporium acremonium* (Brotzu) and shown to contain cephalosporin C by paper chromatography was filtered to remove the mycelium. To the filtrate was added a mycelial acetone powder of *A. flavus* to a concentration of 17 mg./ml. The mixture was shaken at 37° C. for 3 hours and the uptake of oxygen was followed manometrically. Samples were then chromatographed, development being effected with propanol/water (7:3). No residual cephalosporin C could be detected but a zone corresponding to 3-acetoxymethyl-7β-(5-carboxy-5-oxopentanamido)ceph-3-em-4-carboxylic acid was present.

EXAMPLE 5

Extraction and purification of 3-acetoxymethyl-7β-(5-carboxy-5-oxopentanamido)ceph-3-em-4-carboxylic acid Dipotassium salt of cephalosporin C (2.5 g.) was converted to 3-acetoxymethyl-7β-(5-carboxy-5-oxopentanamido)ceph-3-em-4-carboxylic acid following the general procedure of the first paragraph of Example 1. The resultant solution was acidified to pH 2.7 with sulphuric acid, passed through a 100 g. column of Amberlite XAD2. and the column washed with water. Elution of the column with 250 ml. acetone, removal of the acetone under reduced pressure and freeze-drying of the aqueous residue gave a white solid 1.083 g. (69.5 percent overall yield). By direct U.V. assay this solid was 79 percent pure and by T.L.C. was shown to be the desired product. Purity of the solid was improved to 91.5 percent by trituration with 125 ml. acetone. Insoluble solid was removed by filtration and the filtrate distilled to dryness under reduced pressure.

EXAMPLE 6

Cephalosporin C (5 mg./ml.), sodium azide (100 mM) and a freeze-dried cell-free extract (obtained by ultrasonic disintegration) of an amino acid oxidase preparation deriving from *A. flavus-oryzae* (40 units/mg. cephalosporin C) were incubated at 30° C. in 10 ml. 0.1 M sodium pyrophosphate buffer (pH 8.1). 10 μl. samples were taken at 30 minute intervals and examined by electrophoresis on paper.

The process was repeated using amino acid oxidase partially purified by gel filtration.

The electrophoresis papers were examined under an ultra-violet light. The electrophoresis papers from the experiments using the crude amino acid oxidase preparation (freeze-dried cell-free extract) showed a zone of the desired product, 3-acetoxymethyl-7β-(4-carboxy-butanamido)ceph-3-em-4-carboxylic acid, in the 30 minute incubation sample which increased in intensity and was most intense in the 2 and 2.5 hour samples. Incubation for a further 4 hours did not increase either the size or intensity of the zone.

The electrophoretic results for the process using partially purified amino acid oxidase showed that the cephalosporin C zone disappeared completely after about 2.5–3 hours incubation and that the zone corresponding to the desired product reached a maximum intensity about the same time.

EXAMPLE 7

Two 100 ml. systems containing cephalosporin C (5 mg./ml.), sodium azide (10 mM) and amino acid oxidase (60 units/mg. cephalosporin C), obtained by the homogenization of cells of *Trigonopsis variabilis*, were incubated at 33°. One system was gently stirred, the other system was stirred and aerated with a sparger at about 100 ml. air/min.

The results on the T.L.C. plates showed that all the cephalosporin C in the aerated system had been oxidized after 2 hours incubation, 75 percent of the oxidation product being 3-acetoxymethyl-7β-(4-carboxybutanamido)-ceph-3-em-4-carboxylic acid. The unaerated system showed only slight oxidation of cephalosporin C even after 4 hours incubation.

EXAMPLE 8

3-Acetoxymethyl-7β-(4-carboxybutanamido)ceph-3-em-4-carboxylic acid from cephalosporin C fermentation broth 300 ml. of an acidified filtrate of cephalosporin C fermentation broth were adjusted to pH 8.1 with 10 N sodium hydroxide and treated with sodium azide (32.5 mg., 1 mM) *Trigonopsis variabilis* enzyme preparation (4 × 10⁵ units) obtained by homogenization and ammonium sulphate fractionation was added and the pH readjusted to 8.1. The mixture was then incubated at 33° and stirred (150 r.p.m.), while aerated with moist air, at 1 vol./vol./min. The foaming was controlled with M.S. antifoam R.D. (Midland Silicones Ltd.). Samples were removed at hourly intervals for assay and the reaction was terminated after 4 hours. Assay by quantitative paper electrophoresis showed that 95 percent of the cephalosporin C present had been converted into 3-acetoxymethyl-7β-(4-carboxybutanamido)ceph-3-em-4-carboxylic acid.

EXAMPLE 9

Extraction and purification of 3-acetoxymethyl-7β-(4-carboxybutanamido)ceph-3-em-4-carboxylic acid Following the general procedure of the first paragraph of Example 7, with aeration, cephalosporin C was converted in solution into 3-acetoxymethyl-7β-(4-carboxybutanamido)ceph-3-em-4-carboxylic acid. 450 ml. of the solution was adjusted to pH 2.3 with sulphuric acid and extracted 4 times with 150 ml. 15 percent v/v Amberlite LA1 in n-butanol by stirring for 6 min. at the pH meter at pH 4.0 ± 0.3, sulphuric acid being used to adjust the pH. The solvent extracts were back extracted with 1M sodium bicarbonate (6 × 75 ml.). The bulked aqueous extracts were washed with ethyl acetate (2 × 200 ml.), acidified with sulphuric acid and extracted with ethyl acetate (1 × 150 ml., 5 × 100 ml.). The combined solvent extracts were washed with saturated sodium chloride (3 × 20 ml.), dried, and concentrated under reduced pressure to 15 ml. Addition of 300 ml. petroleum gave a sticky precipitate which was dissolved in acetone and distilled to dryness to leave a white glass 0.897 g. By direct U.V. assay this solid was 89.5 percent pure (79 percent extractions).

EXAMPLE 10

Extraction and purification of 3-acetoxymethyl-7β-(4-carboxybutanamido)ceph-3-em-4-carboxylic acid from fermentation broth using Amberlite LA1.

100 ml. cephalosporin C deproteinized fermentation broth containing 0.05 g. 3-acetoxymethyl-7β-(4-carboxybutanamido)ceph-3-em-4-carboxylic acid was acidified to pH 2.0 with sulphuric acid and extracted twice with 60 ml. 15 percent v/v Amberlite LA1 in n-butanol. The pH was adjusted to 2.0 before the second extraction. The solvent extracts were combined, washed with 10 ml. water, and extracted with 1M sodium bicarbonate (3 × 20 ml.). The bulked aqueous extracts were washed with ethyl acetate (2 × 20 ml.), acidified with sulphuric acid and extracted with ethyl acetate (3 × 25 ml.). After washing with 10 ml. water and saturated sodium chloride (2 × 15 ml.) and drying, the ethyl acetate extract was stirred for 3 minutes with 0.5 g. S.S. No. 5 charcoal, filtered and distilled under reduced pressure to 10 ml. Treatment of the concentrated extracts with 250 ml. petroleum yielded a sticky precipitate which was dissolved in acetone and distilled to dryness under reduced pressure to leave a white glass 0.493 g. By direct U.V. assay this solid has $$E_{1\,cm.}^{1\%} = 185,$$

$\lambda_{max.}$ 260 nm. (Purity = 80.5 percent, 79.5 percent extraction).

EXAMPLE 11

Extraction and purification of 3-acetoxymethyl-7β-(4-carboxybutanamido)ceph-3-em-4-carboxylic acid from fermentation broth using Amberlite X AD2

100 ml. cephalosporin C deproteinized fermentation broth containing 0.397 g. 3-acetoxymethyl-7β-(4-carboxybutanamido)ceph- 3-em-4-carboxylic acid was adjusted to pH 8.2 with 4N sodium hydroxide. A heavy precipitate which formed was removed by centrifugation and the supernatant passed through a 20 g. Amberlite XAD2 column at 2–3 ml./min. The combined filtrate and washings were adjusted to pH 2.7 with sulphuric acid and passed through a second 20 g. Amberlite XAD2. column at 1–2 ml./min. After washing with water the second column was eluted with 120 ml. acetone. The acetone was distilled from the eluate under reduced pressure and the aqueous residue freeze-dried to give a pale brown colored solid, 0.595 g. By direct U.V. assay this solid was 65 percent pure.

EXAMPLE 12

3-(Benzoxazolyl-2-thiomethyl)-7β-(5-carboxy-5-oxopentanamido)ceph-3-em-4-carboxylic acid Sodium 3-(benzoxazolyl-2-thiomethyl)-7β-(5-amino-5-carboxypentanamido)ceph-3-em-4-carboxylate (20 mg.) dissolved in 0.1 M phosphate buffer (1 ml.; pH 8) was added to a suspension of *A. flavus* mycelial acetone powder in the same buffer (2 ml. at 25 mg./ml.). The mixture was shaken at 37° C for 80 min. The uptake of oxygen was measured manometrically in a Warburg apparatus; 60 percent of the theoretical uptake was obtained. Paper chromatography showed a new bioactive zone of $R_f$ 0.56 corresponding to the title compound. The starting material had $R_f$ 0.44.

EXAMPLE 13

Proceeding as in Example 12 but using sodium salts of cephalosporin C derivatives appropriately substituted in the 3-position, the following compounds were prepared:
(a) 3-(Benzothiazolyl-2-thiomethyl)-7β-(5-carboxy-5-oxopentanamido)-ceph-3-em-4-carboxylic acid
(b) 3-(Benzimidazolyl-2-thiomethyl)-7β-(5-carboxy-5-oxopentanamido)-ceph-3-em-4-carboxylic acid
(c) S-[7β-(5-Carboxy-5-oxopentanamido)-ceph-3-em-3-ylmethyl]-isothiouronium-4-carboxylate
(d) N-[7β-(5-Carboxy-5-oxopentanamido)-ceph-3-em-3-ylmethyl]-4'-carbonamidopyridinium-4-carboxylate

EXAMPLE 14

7β-(5-Carboxy-5-oxopentanamido)-3-hydroxymethylceph-3-em-4-carboxylic acid

7β-(5-Amino-5-carboxypentanamido)-3-hydroxymethyl-ceph-3-em-4-carboxylic acid (1 ml. at 20 mg/ml. in 0.1 M phosphate buffer at pH 8) was reacted with *A. flavus* acetone powder (2 ml. at 25 mg/ml in 0.1 M phosphate buffer at pH 8) at 37° C. The oxygen absorption over 150 minutes was measured manometrically in a Warburg apparatus and paper chromatograms were run on the resulting solutions, the chromatograms being developed with propanol/water (7:3):

| Time (min) | O₂ absorbed (μl) | % Theoretical |
|---|---|---|
| 0 | 0 | 0 |
| 35 | 251 | 39 |
| 70 | 363 | 56 |
| 120 | 516 | 80 |
| 159 | 538 | 84 |

Theoretical maximum absorption = 640 μl.

The ultraviolet and bioautograph chromatograms corresponded to the title compound.

EXAMPLE 15

3-Acetoxymethyl-7β-(5'-carboxy-5'-oxopentanamido)-ceph-3-em-4-carboxylic acid

*A. flavus-oryzae* mycelial acetone powder (3.7 g.) in water (105 ml.) (pH 7.8) was mixed with a solution of the potassium salt of cephalosporin C (1.04 g.) in water (52 ml.) (pH 7.8). After 3½ hours' reaction with shaking at 37° C. (as in Example 2(a)), the mixture was filtered and the filtrate freeze-dried to give a solid (1.94 g.); $\lambda_{max}$ 260 nm, $$E_{1\,cm.}^{1\%} = 51.2.$$

This solid was dissolved in water (50 ml.), the pH adjusted to 1.5, and the solution extracted with ethyl acetate (1 × 100 ml. and then 4 × 100 ml.). These extracts respectively yielded solid (182 mg.); $\lambda_{max}$ 260 nm, $$E_{1\,cm.}^{1\%} = 165.5,$$

and solid (306 mg.); $\lambda_{max}$ 260 nm, $$E_{1\,cm.}^{1\%} = 64.8,$$

3-acetoxymethyl-7β-(5'-carboxy-5'-oxopentanamido)-ceph-3-em-4-carboxylic acid.

On chromatography these solids had the properties of the product described in Example 2.

We claim:-
1. In a process for the preparation of a 7β-(4-carboxybutanamide) ceph-3-em-4-carboxylic acid, a 7β-(5-carboxy-5-oxopentamido) ceph-3-em-4-carboxylic acid or a salt thereof, the improvement which comprises subjecting a 7β-(D-5-amino-5-carboxypentamido) ceph-2-em-4-carboxylic acid or a salt thereof to the action of cell-free D-amino acid oxidase that has been released from fungal cells, and separating the desired product.

2. A process as defined in claim 1 wherein the D-amino acid oxidase is derived from a species selected from the group consisting of Aspergillus, Penicillium, and Neurospora.

3. A process as defined in claim 2 wherein the Aspergillus species is selected from the group consisting of *A. flavus, A. parasiticus, A. flavus-oryzae* and *A. ustus*.

4. A process as defined in claim 1 wherein the fungal D-amino acid oxidase is derived from a yeast.

5. A process as defined in claim 4 wherein the yeast is *Trigonopsis variabilis*.

6. A process as defined in claim 1 wherein formation of D-amino acid oxidase is induced in the fungal cells by the addition of an amino acid selected from the group consisting of DL-valine, DL-alanine and methionine to the fermentation at the seed stage.

7. A process as defined in claim 1 carries out at a pH of from 6 to 9.

8. A process as defined in claim 1 carried out at a temperature between ambient temperature and 50° C.

9. The process of claim 1 wherein catalase is present when a 7β-(55-oxopentamido) ceph-3-em-4-carboxylic acid or a salt thereof is prepared.

10. The process of claim 1 wherein catalase is absent or any catalase present in the D-amino acid oxidase is inhibited when a 7β-(4-carboxybutanamido) ceph-3-em-4-carboxylic acid or a salt thereof is prepared.

11. The process of claim 1 wherein the 7β-(4-carboxy-butanamido) ceph-3-em-4-carboxylic acid, 7β-(5-carboxy-5-oxopentamido) ceph-3-em-4-carboxylic acid, or salt thereof contains a 3-acetoxymethyl group and is extracted from the aqueous solution in which it has been prepared by acidification to a pH of 1.5 or less followed by extraction with an appropriate solvent.

12. The process of claim 1 wherein the product is recovered from fermentation broths or simple aqueous solutions using solvent extractions in combination with ion exchanger.

13. The process of claim 1 wherein the product is isolated from deproteinized cephalosporin fermentation broths using a combination of a high molecular weight liquid secondary amine and n-butanol followed by extraction with sodium bicarbonate solution and extraction into ethyl acetate.

* * * * *